2,893,844

COMPOSITION OF MATTER

Marion H. Cook, Elkhart, Ind., assignor to Miles Laboratories, Inc., Elkhart, Ind., a corporation of Indiana No Drawing. Application January 8, 1957
Serial No. 632,969

15 Claims. (Cl. 23—253)

This invention relates to an enzymatic method for the determination of glucose in body fluids such as urine, blood and the like, and particularly to a method for the determination of the glucose content of blood.

More particularly, the instant invention relates to a method for the determination of a dangerous level of glucose in blood by a simple test requiring no laboratory equipment, no special reagents, and no skilled operators.

There are a number of methods which can be used to measure or estimate the amount of glucose in blood. The more widely used of these conventional methods are based on the use of alkaline copper solutions which are heated with the material being tested to precipitate cuprous oxide.

These conventional methods have had the disadvantage that their use has required a certain amount of skill and familiarity with measuring equipment such as pipettes and the like, and the use of liquid reagents, some of which, especially the alkaline ones, were dangerous to handle and inconvenient to transport easily.

All of these test techniques and procedures have had as characteristics in common the need for heat which has generally been supplied by some extraneous source such as a Bunsen burner; they also require a test tube or some like container within which the testing is to take place. Some of the prior art tests are additionally time-consuming to a point of impracticality.

More recently, glucose-detecting compositions containing an enzyme which acts on glucose to produce a reaction product whose presence is readily demonstrable have been introduced. Compositions of this type composed, for example, of glucose oxidase, peroxidase, and indicators which undergo color reactions caused by hydrogen peroxide in the presence of peroxidase, are available commercially. It is over compositions such as these that the present invention is a particular improvement, in permitting more accurate detection of predetermined quantities of glucose.

As is well known in the art, the blood sugar level in individuals varies within certain limits. It has been estimated that an acceptable range of blood sugar level may vary in normal human beings from about 80 mg. to about 120 mg. of sugar per 100 ml. of blood. When the blood sugar level falls below the lower limit of this normal range or is in excess of the upper limit of the range, it is an indication to the practising physician of the possible presence of some abnormal condition. Without stating exactly the limits which differentiate normal and abnormal conditions, it is safe to say that such a normal blood level exists. It is desirable, therefore, that a blood sugar test be developed which would indicate a blood sugar level which is above the normal amount. A diagnostic composition which would enable a physician to rapidly and easily determine the blood level of an individual and tell at a glance whether or not an abnormal level existed would serve as a useful tool to the medical profession.

I have now found in novel and highly effective means for detecting glucose in body fluids such as blood which is simple, economical, rapid, convenient and reliable. My new test does not require the use of any heat source and lends itself well to the use of "mass screening" techniques. My new test is free of many of the disadvantages which characterize prior compositions, testing means and procedures, and, in addition, detects only those blood sugar levels which are inherently dangerous, that is to say, which are indicative of an abnormal blood sugar level.

In practising my invention, I prepare a composition of glucose oxidase, peroxidase, an indicator whose color is affected by hydrogen peroxide in the presence of peroxidase, a buffer to keep the pH of the reactants at the site of the reaction within a predetermined range, a stabilizer such as gelatin or a similar material, and antagonist substance which prevents the indicator from reacting with glucose amounts which are below an established blood sugar level.

My composition may be made as a suspension, or as a solution and used to impregnate a bibulous material such as paper, wood, fiber or the like, having any desired size or shape. Such a product, after drying, will undergo a distinct color change when contacted with glucose-containing materials. However, the antagonist substance present in the composition will prevent the composition from indicating a blood sugar content below a predetermined level.

Alternately, the composition of this invention may be applied to splinters, sticks or strips made of wood, fiber, glass, metal or plastic using gelatin or a similar substance for effecting adhesion thereto. Such sticks will turn color when moistened with a glucose-containing fluid.

Alternately, also, such a composition may be formed into a tablet and used by applying the fluid to be tested to the tablet. For example, placing a drop or two of suspect blood on the face of the tablet, allowing it to remain for a sufficient period of time to enable the reaction to occur, removing the blood and observing the color change.

The following examples will serve to illustrate a number of specific embodiments of my invention. It will be apparent to those skilled in the art that various modifications of the invention may be made without departing from the spirit and scope thereof.

EXAMPLE I

Formulation:
    5.0 mg. peroxidase
    200.0 mg. glucose oxidase
    100.0 mg. o-tolidine dihydrochloride
    200.0 mg. gelatin
    2.0 grams solid buffer (32% anhydrous citric acid—68% sodium citrate dihydrate)
    4.0 mg. hydroquinone
    20.0 ml. water

*Procedure.*—The gelatin was dissolved in 5 ml. of boiling water and cooled to room temperature. The solid buffer was suspended in 5 ml. of water and mixed with the gelatin to result in a clear solution. The orthotolidine dihydrochloride was dissolved in 5 ml. of water and was added to the above mixture. There was immediately added 2.5 ml. of water containing the peroxidase and glucose oxidase, and 2.5 ml. of water containing the hydroquinone.

This composition was mixed and filter paper strips were dipped in it. Each strip measured 2″ x ¼″ and the strips were dried after the dipping.

EXAMPLES II–IV

In the following examples the amount of the antagonist, the specific compound used being hydroquinone, was varied from 0.03% to 0.005%. All other ingredients of the composition and the procedure for preparing the test strips were the same.

Test solutions containing 100, 150, 200, 300 and 500 mg. of sugar per 100 ml. of dog blood were prepared. The test strips prepared in accordance with Examples II through IV above were used to determine the glucose blood level in the various test solutions. Data resulting from this series of determinations is set out in Table I below.

Table I

| Antagonist in Composition (Percent) | Example No. | Test Results [1] Glucose Content of Blood, mg./100 ml. of blood | | | | | |
|---|---|---|---|---|---|---|---|
| | | 0 | 100 | 150 | 200 | 300 | 500 |
| 0.005 | IV | + | + | + | + | + | + |
| 0.020 | I | 0 | 0 | tr. | + | + | + |
| 0.030 | II | 0 | 0 | 0 | tr. | + | + |
| 0.040 | III | 0 | 0 | 0 | 0 | 0 | 0 |

[1] Key: +—positive; 0—negative; tr.—trace.

An examination of the data set out in Table I above shows the effect of the varying amounts of the antagonists used. It will be seen that by increasing the amount of the antagonist present the blood sugar level at which a positive test is obtained will be correspondingly increased. Example IV containing 0.005% of the antagonist gave a positive test for glucose in all concentrations. Example III containing 0.040% of the antagonist gave a negative test at all concentrations of glucose. However, in Example II when the amount of the antagonist was 0.030% a positive test was obtained on the blood sample containing 300 mg. of sugar per 100 ml. of blood. A positive test was also obtained on the sample of blood containing 500 mg. of sugar per 100 ml. of blood. In Example I which contained 0.02% of the antagonist a positive test was obtained on the sample of blood containing 150 mg. of sugar per 100 ml. of blood. Thus by proper adjustment of the amount of the antagonist present, one may predetermine the level at which a positive test is obtained.

In the illustrative examples set out above, it is to be seen that an amount of the specific antagonist, that is hydroquinone, should be selected ranging between about 0.005% and 0.04%. It will be understood, of course, that with other antagonist other amounts must be used to effect the desired results. Other amounts of hydroquinone may also be used to change the concentration of blood sugar at which a positive test is obtained.

EXAMPLE V

A base formulation was prepared according to the following:

5.0 mg. peroxidase
240.0 mg. glucose oxidase
50.0 mg. o-tolidine hydrochloride
240.0 mg. gelatin
2.0 mg. a solid buffer consisting of 18.5% anhydrous citric acid and 81.5% sodium citrate dihydrate
100.0 mg. algin
20 ml. of water Using various amounts of antagonist materials, and the procedure described in detail in connection with Example I above, test strips were prepared. The strips were tested in order to determine the blood sugar level at which a positive test was always obtained, and the blood sugar level below which a negative result was always obtained.

The antagonist materials used in this series of examples were ascorbic acid, cysteine hydrochloride and dihydroxymaleic acid.

The data obtained is set out in Table II below:

Table II

| Antagonist (Percent) | Mg. Glucose/100 ml. Blood | |
|---|---|---|
| | Less than—Always Negative | More than—Always positive |
| Ascorbic Acid: | | |
| 0.002 | 40 | 70 |
| 0.010 | 70 | 100 |
| 0.030 | 130 | 160 |
| 0.050 | 200 | 300 |
| Cysteine Hydrochloride: | | |
| 0.013 | 25 | 40 |
| 0.025 | 60 | 80 |
| 0.038 | 70 | 90 |
| 0.050 | 80 | 100 |
| 0.065 | 90 | 140 |
| 0.075 | 90 | 150 |
| 0.100 | 140 | 200 |
| 0.125 | 180 | 300 |
| 0.150 | 200 | 450 |
| 0.200 | 300 | 900 |
| Dihydroxymaleic Acid: | | |
| 0.125 | 40 | 60 |
| 0.250 | 50 | 75 |
| 0.500 | 100 | 150 |
| 0.550 | 100 | 160 |
| 0.625 | 180 | 240 |

From the data reported in Table II above it is obvious that various antagonist substances may be used in the concept of this invention and that compositions may be prepared so as to give a positive test at any desired blood sugar level.

Variations of the ingredients of the test compositions are, of course, possible within the skill of those familiar with the art. For example, the indicator may vary from about 30 to about 200 parts, the peroxidase content from about 1 to about 100 parts. The glucose oxidase may vary from between about 25 to about 500 parts and the gelatin, algin or similar stabilizer may be present from 0 part up to about 1,000 parts. Ordinarily, however, it is preferred to use from about 50 to about 500 parts of gelatin or the like.

As was described above, sufficient buffer should be present to "dominate" the pH of the blood so that the pH of the composition where the reactions occur, range from about pH 4 to about pH 6, preferably at about pH 5.

It will be understood that a number of buffer systems are available and well known in the art. The buffer system described in connection with Example V above is, however, the preferred buffer and is utilized in the preferred embodiment.

While gelatin and algin separately are very useful in stabilizing the above mentioned compositions, they may be advantageously combined as is shown in Example V. However, other stabilizing materials which are in the nature of a protein degradation product may also be used. For example, glutamic acid, glycine, and other products such as polypeptides, and the like are operable in this concept of my invention. In addition to stabilizing the formulations, these materials aid the efficacy of the test strips by making the strip less absorbent and thus easier to wash free from blood.

The preferred indicator component of my test compositions is o-tolidine, conveniently as the hydrochloride. Other indicators which can be used include benzidine, guaiacol, mixtures of benzidine and resorcinol, pyrogallol, gallic acid, leucomalachite green, leucophenolphthalein, guaiacol, 2,7-diamino fluorene and the like. In the foregoing examples the particular glucose oxidase used had an activity of about 2,600 units per gram, a unit being by definition that quantity of enzyme which will cause a rate of oxidation uptake of 10 cubic ml. of oxygen at 30° C. by a solution of glucose contained in a Warburg flask.

The peroxidase used in the examples above was obtained from horseradish and its activity was about the same order as the hemoglobin of blood which may be substituted therefor.

In addition to the specific antagonist compositions used in the foregoing examples, it will be understood that other antagonists may be used. Although the exact operation of the antagonist composition is not specifically known, it is believed that this composition absorbs or uses up the hydrogen peroxide liberated by a reducing operation. Thus until the antagonist composition is completely reduced, the hydrogen peroxide formed by the enzymatic reaction with glucose present will preferentially reduce the antagonist before it reacts with peroxidase and the indicator to give the desired color. It is therefore obvious that other antagonist materials, which are in the nature of a reducing substance, may be used. For example, dihydroxy maleic acid, sulfhydryl compounds, sodium sulfite, sodium hydrosulfite, ethylene glycol, resorcinol, catechol, potassium and sodium nitrite are operable in the concept of this invention.

There is also a wide variability possible in the ratio of glucose oxidase and peroxidase which can be used in preparing the compositions used in the practise of my invention. For example, the glucose oxidase content can be increased as much as 100 times and decreased to even 1/10 of the amount described and still provide a functional testing device. It is necessary only that there be sufficient oxidase present to catalyze the oxidation of the glucose and enough peroxidase present so that it can exercise its own enzyme activity.

To summarize briefly, the present invention relates to a novel testing method for the determination of specific glucose levels in blood. The test device comprises a mixture of glucose oxidase, peroxidase, an indicator which is capable of undergoing a color change in the presence of peroxidase and hydrogen peroxide, a buffer solution for maintaining the pH of the composition at or near pH5, gelatin, a protein degradation product or mixtures as a stabilizing agent, and an antagonistic composition which serves to predetermine the level at which the color change occurs.

I claim:

1. A diagnostic composition for detecting concentrations of glucose above a predetermined amount, comprising an enzyme system which has oxidase activity for glucose, contains peroxidase, and results in peroxide formation when contacted with glucose; an indicator which undergoes a color reaction caused by peroxide in the presence of peroxidase; and a composition which is (a) reactable with hydrogen peroxide, (b) is present in a predetermined quantity only sufficient to react with the hydrogen peroxide producible by the action of the said enzyme system on the said predetermined amount of glucose, (c) reacts preferentially over the indicator and (d) does not undergo a color change during such reaction.

2. A diagnostic composition for detecting concentrations of glucose in blood above a predetermined minimal amount comprising a composition which contains glucose oxidase, peroxidase and results in peroxide formation when contacted with glucose; a compound which undergoes a color reaction caused by peroxide in the presence of peroxidase; a buffer for maintaining the pH of the aforesaid mixture at about 4 to about 6 in the presence of blood; and a material which is (a) reactable with hydrogen peroxide, (b) is present in a predetermined quantity only sufficient to react with the hydrogen peroxide producible by the action of said composition on said predetermined amount of glucose, (c) reacts preferentially over the indicator compound and (d) does not undergo a color change during such reaction.

3. A test indicator for detecting concentrations of glucose above a predetermined minimal amount which comprises bibulous material containing therein a composition which comprises glucose oxidase and peroxidase and which results in peroxide formation when contacted with glucose; an indicator which undergoes a color reaction caused by peroxide in the presence of peroxidase; and a composition which is (a) reactable with hydrogen peroxide, (b) is present in a predetermined quantity only sufficient to react with the hydrogen peroxide producible by the action of the said composition on said predetermined amount of glucose, (c) reacts preferentially over the indicator and (d) does not undergo a color change during such reaction.

4. A test indicator for detecting concentrations of glucose in blood above a predetermined minimal amount which comprises a bibulous material containing therein a mixture which comprises glucose oxidase and peroxidase and which results in peroxide formation when contacted with glucose; an indicator which undergoes a color reaction caused by peroxide in the presence of peroxidase; a buffer for maintaining the pH of the mixture at about 4 to about 6 in the presence of blood; and a composition which is (a) reactable with hydrogen peroxide, (b) is present in a predetermined quantity only sufficient to react with the hydrogen peroxide producible by the action of the said mixture on said predetermined amount of glucose (c) reacts preferentially over the indicator and (d) does not undergo a color change during such reaction.

5. The article of claim 4 wherein the bibulous material is paper.

6. The article of claim 5 wherein the said mixture contains gelatin.

7. The article of claim 5 wherein the said mixture contains a protein degradation product.

8. The article of claim 5 wherein the said mixture contains algin.

9. The article of claim 5 wherein the material reactable with hydrogen peroxide is hydroquinone.

10. The article of claim 1 wherein the composition which is reactable with hydrogen peroxide is cysteine.

11. The composition of claim 1 wherein the composition which is reactable with hydrogen peroxide is dihydroxy maleic acid.

12. The composition of claim 1 wherein the composition which is reactable with hydrogen peroxide is ascorbic acid.

13. The article of claim 5 wherein the material reactable with hydrogen peroxide is cysteine.

14. The article of claim 5 wherein the material reactable with hydrogen peroxide is dihydroxy maleic acid.

15. The article of claim 5 wherein the material reactable with hydrogen peroxide is ascorbic acid.

References Cited in the file of this patent
FOREIGN PATENTS 203,451     Australia _____ Sept. 27, 1956

OTHER REFERENCES

"Modern Drugs," May 1956, pp. 713 and 728.
British Medical Journal, Sept. 8, 1956, pp. 586 to 588.